United States Patent
Aso (10) Patent No.: US 6,606,536 B1
(45) Date of Patent: Aug. 12, 2003

(54) MAGNETIC BEARING DEVICE AND MAGNETIC BEARING CONTROL DEVICE

(75) Inventor: Mitsuto Aso, Narashino (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/511,442

(22) Filed: Feb. 23, 2000

(30) Foreign Application Priority Data

Feb. 25, 1999 (JP) .......................................... 11-048768

(51) Int. Cl.[7] .............................................. G06F 19/00
(52) U.S. Cl. ..................................... 700/174; 310/90.5
(58) Field of Search ........................... 700/174, 42, 44, 700/45; 310/90.5, 90

(56) References Cited

U.S. PATENT DOCUMENTS

| | | | | |
|---|---|---|---|---|
| 5,578,880 A | * | 11/1996 | Lyons et al. | 310/90.5 |
| 5,666,014 A | * | 9/1997 | Chen | 310/90.5 |
| 5,783,885 A | * | 7/1998 | Post | 310/90.5 |
| 5,923,559 A | * | 7/1999 | Yamamoto | 700/170 |
| 6,005,315 A | * | 12/1999 | Chapman | 310/90.5 |
| 6,009,700 A | * | 1/2000 | Wassenhoven et al. | 57/263 |
| 6,267,876 B1 | * | 7/2001 | Allaire et al. | 310/90.5 |
| 6,320,289 B1 | * | 11/2001 | Ueyama et al. | 310/90.5 |
| 6,348,749 B1 | * | 2/2002 | Ueyama | 310/90.5 |
| 6,353,273 B1 | * | 3/2002 | Heshmat et al. | 310/90.5 |
| 6,380,652 B1 | * | 4/2002 | Ueyama et al. | 310/90.5 |

* cited by examiner

Primary Examiner—Leo Picard
Assistant Examiner—Zoila Cabrera
(74) Attorney, Agent, or Firm—Adams & Wilks (57) ABSTRACT

To automatically perform confirmation and adjustment of parameters for checking a model type of a magnetic bearing body and controlling the magnetic bearing body, the magnetic bearing body 20 is provided with a resistor 412 for identifying a model type and a body EEP-ROM 411 in which the model type and various characteristic values are stored. A control device 40 is provided with a device EEP-ROM 401 into which the model type and various characteristic values are stored and with a ROM table 402 into which various characteristics corresponding to a plurality of model types are stored. In the case where the various characteristics of the body EEP-ROM 411 and the device EEP-ROM 401 are normal but not identical with each other, the device EEP-ROM 401 is renewed to the content of the body EEP-ROM 411. Thus, even if the model type of the magnetic bearing body 20 is changed, the adjustment of the various characteristics is automatically performed without necessity for a special technician to adjust the device.

25 Claims, 5 Drawing Sheets

PRIOR ART

MAGNETIC BEARING DEVICE AND MAGNETIC BEARING CONTROL DEVICE

BACKGROUND OF THE INVENTION

1. Field of the Invention

The present invention relates to a magnetic bearing device, a magnetic bearing control device for controlling a rotary body by using a magnetic bearing, and a vacuum pump and, more particularly, to a magnetic bearing device and a magnetic bearing control device used in a main spindle of a machine tool, a vacuum pump or the like.

2. Description of the Related Art

With such a magnetic bearing device, it is possible to levitate a rotary body and perform super high speed rotation thereof in a contactless manner and an oilless manner, to use the device in the vicinity of clean rooms and to dispense with routine maintenance such as changing oil or bearings. For this reason, the magnetic bearing device is widely used in a centrifugal atomizer for producing metal powder, metal pipe machining, a main spindle of a machine tool such as a cylinder grinder, and a vacuum pump.

Figure 5:
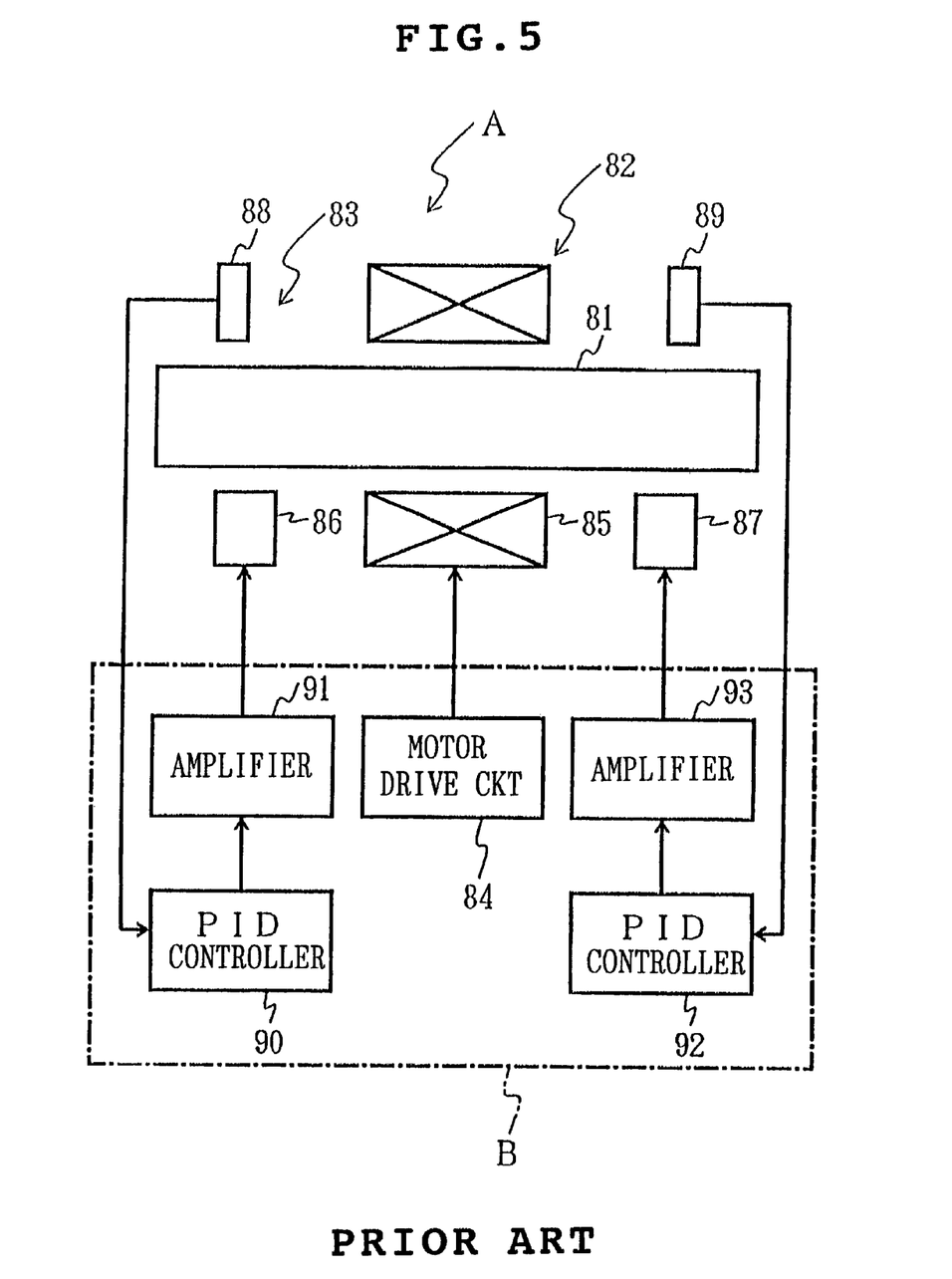
FIG. 5 is an illustration of a general structure of a conventional magnetic bearing device.

FIG. 5 shows a general structure of the conventional magnetic bearing device.

As shown in FIG. 5, the magnetic bearing device is provided with a magnetic bearing body A and a control device B which are connected with each other through cables.

The magnetic bearing body A is basically composed of a rotary shaft 81, a motor 82 provided around the rotary shaft 81 for rotating the rotary shaft 81, and a magnetic bearing 83 for magnetically floating and supporting both ends of the rotary shaft 81.

The control device B is basically composed of a motor drive circuit 84, amplifiers 91 and 93 and PID controllers 90 and 92.

Any type of appropriate motor, such as a brushless DC motor or a high frequency motor, may be used as the motor 82. The motor drive circuit 84 drives a motor drive coil 85 fixed around the rotary shaft 81 so that the rotary shaft 81 may be rotated.

The magnetic bearing 83 is provided with two pairs of electromagnets 86 that are arranged to face each other with respect to the rotary shaft 81 (in which both pairs are perpendicular to each other and this will hereinafter be the same), two pairs of displacement sensors 89 arranged to face each other in the vicinity thereof, two pairs of electromagnets 87 that are arranged to face each other and two pairs of displacement sensors 89 arranged to face each other in the vicinity thereof.

Each displacement sensor 88, 89 detects a radial displacement of the rotary shaft 81 to feed this detected displacement to the control device B.

When the detected displacements by the displacement sensors 88 and 89 are fed to the control device B, the PID controllers 90 and 92 compare the detected displacements with target values, the control device B provides the amplifiers 91 and 93 (electromagnet drive circuits) with such a signal that both are identical. Then, magnetic forces of the corresponding electromagnets 86 and 87 are controlled so that the rotary shaft 81 is displaced to the target position by the amplifiers 91 and 93. As a result, the rotary shaft 81 may be magnetically supported in a contactless condition.

In such a conventional magnetic bearing device, since an error is generated at a mechanical central position and at an electric central position of the rotary body including the rotary shaft 81, their adjustments are required to correct each magnetic bearing body A for every unit. Also, sizes of the magnetic bearing bodies A and various characteristics such as a current value, standard value or the like for magnetically floating and controlling the rotary body are different depending upon the model type (product specification). Therefore, since the floating position is changed depending upon the difference, it is necessary to make setup for every model type.

Accordingly, the parameters are changed for the control of the control device B for every unit of the magnetic bearing body A to be connected. This should be done by the specialists for adjustment or setup.

Also, in the conventional magnetic bearing device, in the case where the magnetic bearing body A is replaced by another model, it is requisite to change the parameters of the control device B. Therefore, there is no special countermeasure for the case where the machine is driven without any change.

Furthermore, the conventional device does not cope with the case where the values of the parameters set in the control device B become abnormal due to electric or mechanical faults or the like.

Thus, when the magnetic bearing body A is controlled with the different parameters, the magnetic bearing body A can not exhibit the sufficient ability as the magnetic bearing or causes a breakdown of the device.

SUMMARY OF THE INVENTION

Accordingly, the present invention has been made in order to overcome the above-noted problems inherent in the conventional magnetic bearing device, and a primary object of the present invention is to provide a magnetic bearing device having means for enabling a control device to check the model of the magnetic bearing to be connected thereto.

Also, a second object of the invention is to provide a magnetic bearing control device that may automatically perform confirmation and adjustment of parameters for controlling the magnetic bearing body.

In order to attain the primary object, according to the present invention, there is provided a magnetic bearing device for magnetically floating a rotary shaft to hold the rotary shaft in a contactless manner, comprising: a model type identifying means for identifying a model type; a first memory means for storing various characteristic values corresponding to the model type; and a connecting means for accessing the model type identifying means and the first memory means from the outside.

In the magnetic bearing device according to the invention, the model type identifying means comprises a resistor having a resistance value determined corresponding to the model type, and the memory means comprises a rewritable memory means.

In order to attain the second object, according to the present invention, there is provided a magnetic bearing control device for performing a magnetically floating control for a magnetic bearing device magnetically floating a rotary shaft to hold the rotary shaft in a contactless manner, comprising: a second memory means which is rewritable for storing a model type and various characteristic values of a magnetic bearing to be connected; an obtaining means for obtaining the model type and various characteristic values of the magnetic bearing device through a connecting means of the magnetic bearing device; a renewal means for renewing a content of the second memory means to a content of a first memory means if the model type and various characteristic values obtained by the obtaining means and the model type and various characteristic values stored in the second memory means are different from each other; and a controlling section for performing magnetically floating control for the magnetic bearing device to be connected in accordance with the characteristic values stored in the second memory means.

In the magnetic bearing device according to the invention, there is further provided a judgment means for judging whether or not contents of the first memory means and the second memory means are normal, and the renewal means renews the content of the second memory means to the content of the first memory means if it is judged by the judgment means such that contents of the first memory means and the second memory means are normal.

In order to attain the second object, according to the present invention, there is provided a magnetic bearing control device for performing a magnetically floating control for a magnetic bearing device magnetically floating a rotary shaft to hold the rotary shaft in a contactless manner, comprising: a second memory means which is rewritable for storing a model type and various characteristic values of a magnetic bearing to be connected; an obtaining means for obtaining the model type and various characteristic values of the magnetic bearing device through a connecting means of the magnetic bearing device; a judgment means for judging whether or not contents of the first memory means and the second memory means are normal; a renewal means, if the judgment means judges such that one of contents of the first memory means and the second memory means is abnormal, for renewing the content of one of the first and second memory means to the content of the other that has been judged to be normal; and a controlling section for performing magnetically floating control for the magnetic bearing device to be connected in accordance with the various characteristic values stored in the second memory means.

In order to attain the second object, according to the present invention, there is provided a magnetic bearing control device for performing a magnetically floating control for a magnetic bearing device for magnetically floating a rotary shaft to hold the rotary shaft in a contactless manner, comprising: a second memory means which is rewritable for storing a model type and various characteristic values of a magnetic bearing to be connected; an obtaining means for obtaining the model type and various characteristic values of the magnetic bearing device through a connecting means of the magnetic bearing device; a judgment means for judging whether or not contents of the first memory means and the second memory means are normal; a third memory means for storing various characteristic values corresponding to a plural kinds of model types; a renewal means, if the judgment means judges that contents of the first memory means and the second memory means are abnormal, for reading the various characteristic values corresponding to the model type obtained by the obtaining means from the third memory means and renewing the contents of the first and second memory means; and a controlling section for performing magnetically floating control for the magnetic bearing device to be connected in accordance with the various characteristic values stored in the second memory means.

DETAILED DESCRIPTION OF THE PREFERRED EMBODIMENTS

A magnetic bearing device in accordance with a preferred embodiment of the present invention will now be described with reference to FIGS. 1 to 4.

Figure 1:
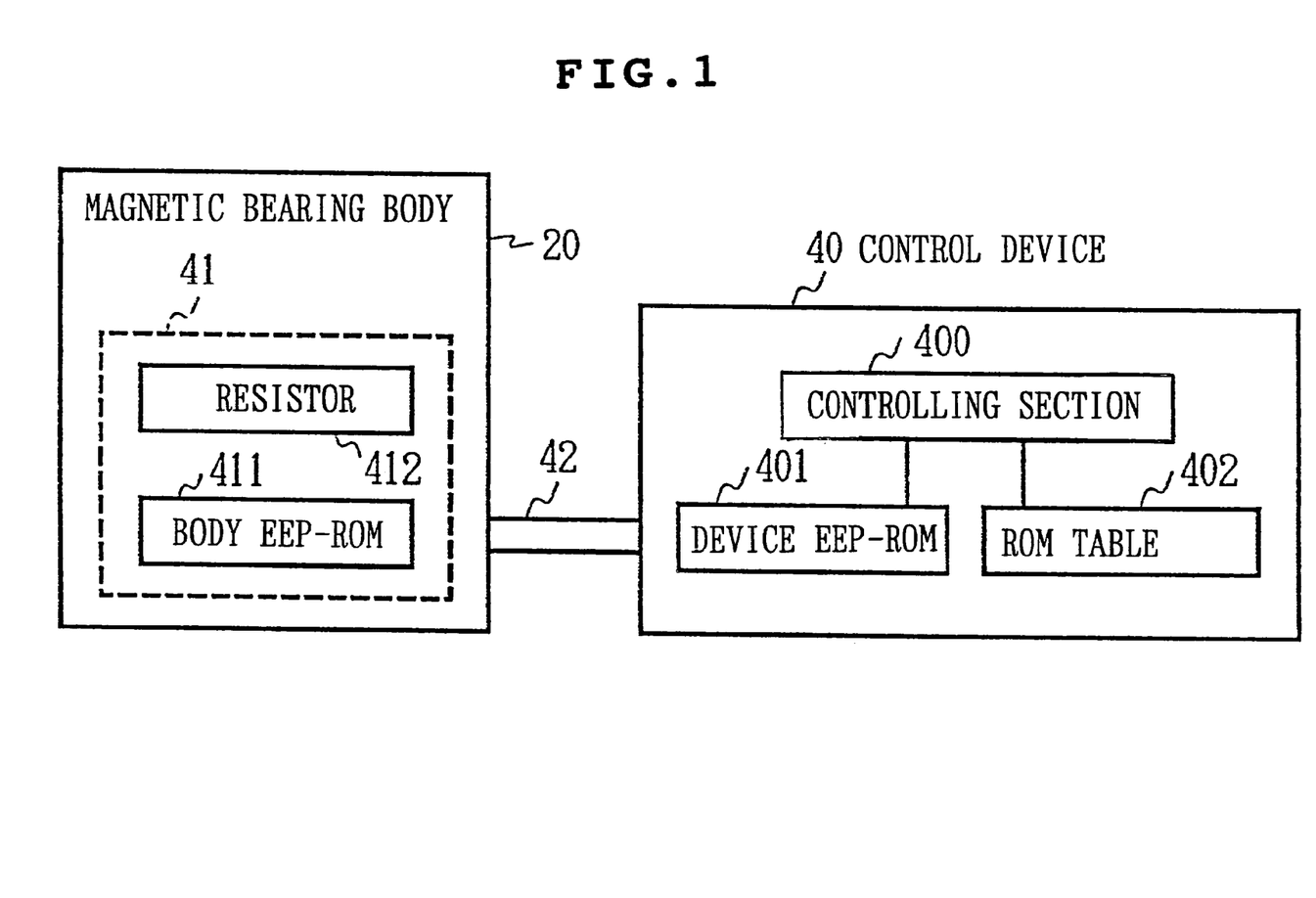
FIG. 1 is a block diagram showing a structure in accordance with an embodiment of the invention.

FIG. 1 shows a necessary structure for realizing the function of the magnetic bearing device in accordance with the embodiment.

As shown in FIG. 1, the magnetic bearing device is provided with a magnetic bearing body 20 having a magnetic bearing, a motor and the like for magnetically floating a rotary body and a control device 40 for controlling the magnetic bearing or the motor in response to various characteristics of the magnetic bearing body 20. Both components are connected with each other through a cable 42.

The magnetic bearing body 20 is provided with an element for the magnetic bearing or the motor and is provided with a substrate 41 connected to the cable 42. Disposed on the substrate 41 are a body EEP-ROM 411 storing data representative of a model type of the magnetic bearing body 20 and various characteristic values for every magnetic bearing unit (including data for compensation for the errors between the mechanical center and the electrical center) and a resistor 412 for specifying the model type of the magnetic bearing body 20. The resistance value of the resistor 412 is determined in response to the model type of the magnetic bearing body.

On the other hand, the control device 40 is provided with a controlling section 400 for controlling the magnetic bearing body 20 and a device EEP-ROM 401 and a ROM table 402 connected to the controlling sections 400.

The controlling section 400 is basically composed of a motor drive circuit, an amplifier and a PID controller and functions in the same manner as in the conventional control device shown in FIG. 5 in accordance with the information recorded in the device EEP-ROM 401. The controlling section 400 may read the contents of the ROM table 402 and read and rewrite the device EEP-ROM 401. Also, the controlling section 400 may read the content of the body EEP-ROM 411 and the content of the resistor 412 and rewrite the content of the EEP-ROM from the magnetic bearing body 20.

The data representative of the model type of the magnetic bearing body 20 and the various characteristic values for every magnetic bearing unit (including the data for compensation for the error between the mechanical center and the electric center) are stored in the device EEP-ROM 401.

On the other hand, a model type corresponding to each of a plural kinds of magnetic bearing bodies and the various characteristic values are stored in the ROM table 402.

Figure 2:
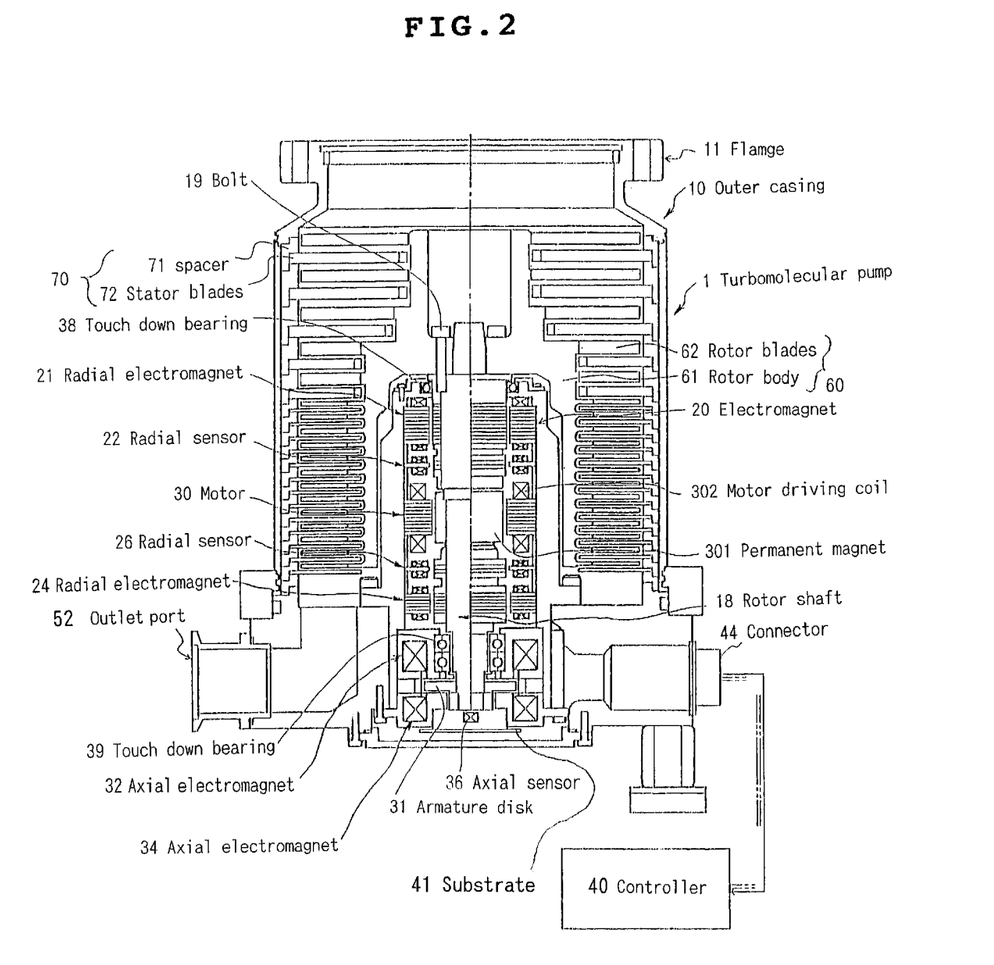
FIG. 2 is an overview showing the structure of a turbo molecular pump in which a magnetic bearing body is used.

FIG. 2 is a cross-sectional view showing an overall structure of a turbo molecular pump in which the magnetic bearing body 20 is used.

The turbo molecular pump 1 is installed within, for example, a semiconductor manufacturing apparatus for discharging process gas from a chamber or the like. In this example, a flange 11 is formed at an upper end portion of an outer casing 10 that is formed into a cylindrical shape and is connected to the semiconductor manufacturing apparatus or the like by bolts or the like.

As shown in FIG. 2, the turbo molecular pump 1 is provided with a substantially cylindrical rotor shaft 18 to be arranged at the central portion of the substantially cylindrical outer casing 10. A rotor body 61 having a substantially inverted U-shaped cross-section is disposed around the rotor shaft 18 and is mounted on an upper portion of the rotor shaft 18 by bolts 19. Rotor blades 62 are arranged around the rotor body 61. The rotor blades 62 in each stage have a plurality of rotor blades (vanes) whose outer sides are opened.

Also, the turbo molecular pump 1 is provided with a rotor 60 and a stator 70.

The stator 70 is composed of a plurality of stator blades 72 and cylindrical spacers 71 having stepped portions. The stator blade 72 in each stage is assembled alternatively with the rotor blade 62 in each stage. The outer peripheral portion of the stator blade 72 in each stage is clamped by the spacer 71 and the stepped portion of the spacer 71 so that it is held between the rotor blades 62.

The stator 70 is fixedly arranged inside of the outer casing 10.

The turbo molecular pump 1 is further provided with the electromagnet or magnetic bearing body 20 for supporting the rotor shaft 18 by the magnetic force and a motor 30 having a permanent magnet 301 and a driving coil 302 for generating a torque to the rotor shaft 18.

The magnetic bearing body 20 is provided with radial electromagnets 21 and 24 for generating magnetic forces to the rotor shaft 18 in the radial direction, radial sensors 22 and 26 for detecting the position in the radial of the rotor shaft 18, axial electromagnets 32 and 34 for generating magnetic forces in the axial direction to the rotor shaft 18, a metal disc 31 to which magnetic forces in the axial direction are applied by the axial electromagnets 32 and 34, and an axial sensor 36 for detecting the position in the axial direction of the rotor shaft 18.

The radial electromagnet 21 is composed two pairs of electromagnets disposed perpendicular to each other. The pairs of electromagnets are arranged to face each other on both sides of the rotor shaft 18 at a position above the motor 30 of the rotor shaft 18.

Two pairs of radial sensors 22 that are arranged to face each other on both sides of the rotor shaft 18 in the vicinity of the radial electromagnets 21 are provided between the radial electromagnets 21 and the motor 30. The two pairs of radial sensors 22 are arranged perpendicular to each other corresponding to the two pairs of radial electromagnets 21.

In the same manner, two pairs of radial electromagnets 24 are arranged to face each other at a position below the motor 30 of the rotor shaft 18.

Also, in the same manner, two pairs of radial sensors 26 are arranged in the vicinity of the radial electromagnets 24 between the radial electromagnets 24 and the motor 30.

When exciting current is fed to these radial electromagnets 21, 24, the rotor shaft 18 is magnetically floated. The exciting current is controlled in response to a position detection signal from the radial sensors 22 and 26 during the magnetic floating action so that the rotor shaft 18 is maintained at a predetermined position in the radial direction.

The disc-shaped metal disc 31 made of magnetic material is fixed to a lower portion of the rotor shaft 18. The axial electromagnets 32 and 34 are arranged relative to each other on both sides of the metal disc 31. Furthermore, the axial sensor 36 is arranged to face the lower end portion of the rotor shaft 18.

The exciting current for the axial electromagnets 32 and 34 is controlled in response to the position detection signal from the axial sensor 36 so that the rotor shaft 18 is maintained at a predetermined position in the axial direction.

Wiring for driving the respective sensors and the motor and the substrate 41 on which the body EEP-ROM 411 and the resistor 412 shown in FIG. 1 are arranged, are provided in the axial lower portion of the magnetic bearing body 20. The substrate 41 is connected to the control device 40 through a connector 44 and a cable 42. The control device 40 performs feedback control of the exciting current of the radial electromagnets 21 and 24 and the axial electromagnets 32 and 34 on the basis of the detection signal as of the radial sensors 22 and 26 and the axial sensor 36 to thereby magnetically float the rotor shaft 18.

Protective bearings or touch-down bearings 38 and 39 are arranged on the upper and lower portions of the rotor shaft 18.

Normally, the rotor shaft 18 and the rotor portion composed of respective parts mounted on the rotor shaft 18 are pivoted in a contactless manner by the magnetic bearing body 20 during the rotation by the motor 30. The protective bearings 38 and 39 are bearings for pivoting the rotor portion instead of the magnetic bearing body 20 in case of touchdown, thereby protecting the overall device.

Accordingly, the protective bearings 38 and 39 are arranged with their inner races being kept in the contactless manner.

The motor 30 is arranged substantially at the center in the axial direction of the rotor shaft 18 between the radial sensor 22 and the radial sensor 26 inside of the outer casing 10. When the current is applied to the motor 30, the rotor shaft 18 and the rotor 60 fixed thereto are rotated.

An outlet port 52 for discharging process gas or the like from the semiconductor manufacturing apparatus is arranged at a lower portion of the outer casing 10 of the turbo molecular pump 1.

The operation of the thus constructed magnetic bearing body 20 and the control device 40 will now be described.

Figure 3:
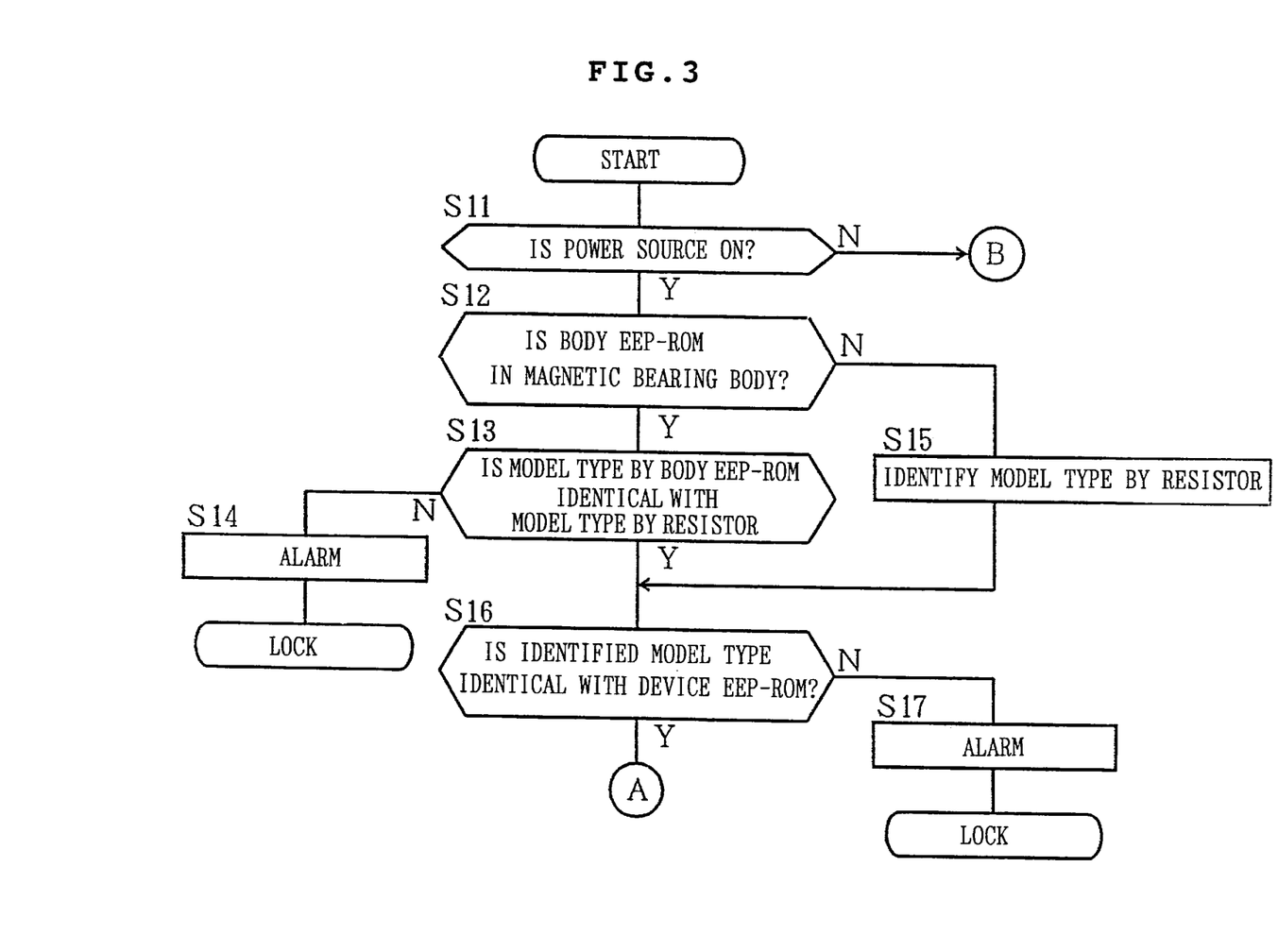
FIG. 3 is a flowchart showing a part of the operation of the adjustment process and model type confirmation of the magnetic bearing body according to a control device.
Figure 4:
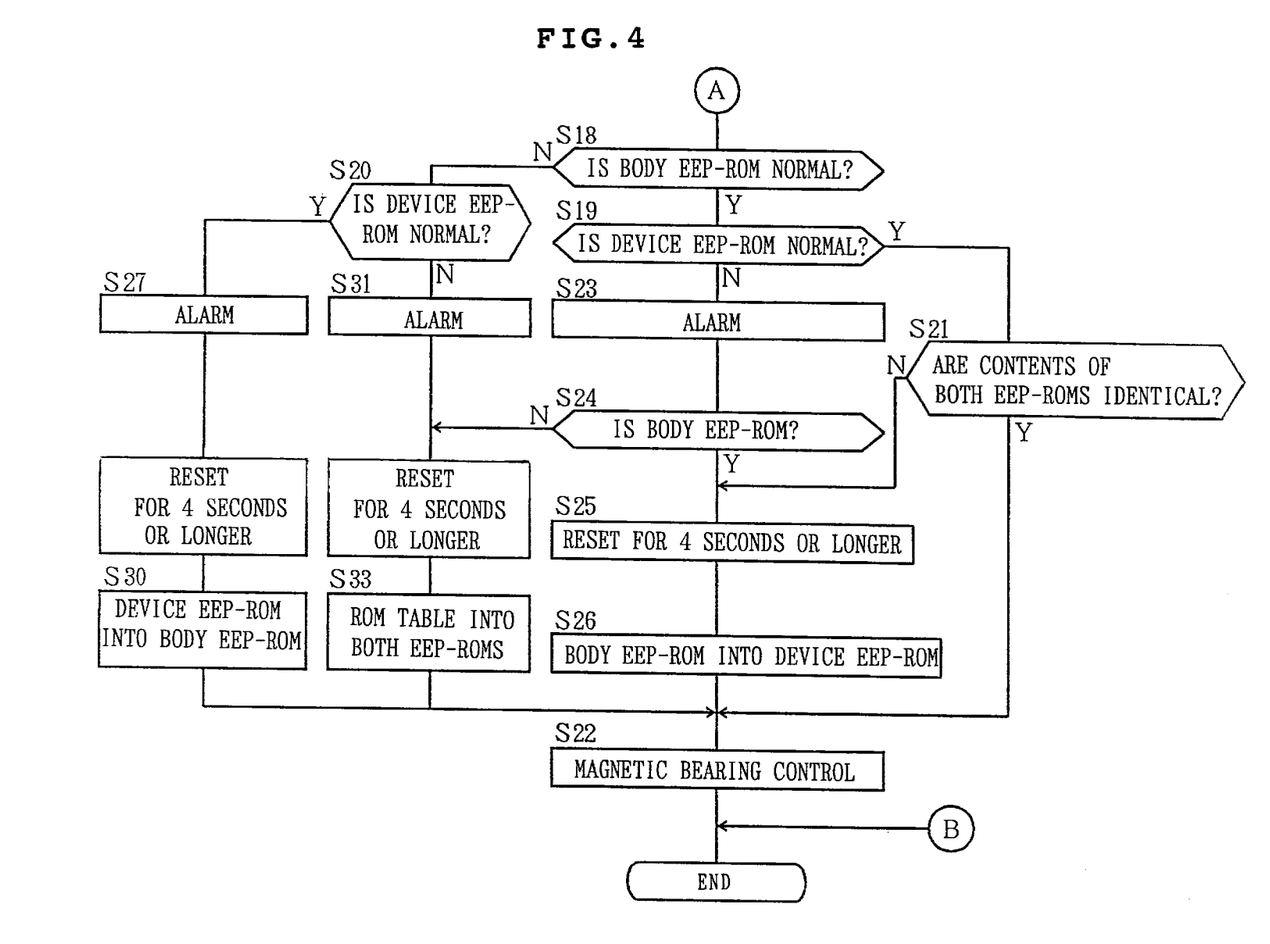
FIG. 4 is a flowchart showing the rest of the operation of the adjustment process and the model type confirmation of the magnetic bearing body according to the control device.

FIGS. 3 and 4 are flowcharts representative of the model type confirmation and the adjustment process of the magnetic bearing body 20 by the control device 40.

When the power source is turned on (step 11; Y), the controlling section 400 of the control device 40 confirms whether or not the body EEP-ROM 411 is installed on the substrate 41 of the magnetic bearing body 20 connected through the cable 42 (step 12).

In the case where the body EEP-ROM 411 is installed (step 12; Y), the controlling section 400 compares the model type of the magnetic bearing body 20 identified by the data stored in the body EEP-ROM 411 with the model type identified by the resistance value of the resistor 412 to thereby judge whether or not both types are identical with each other (step 13). In the case where the model types are identical not with each other (step 13; N), the controlling section 400 outputs an alarm sound, flashes an alarm lamp and performs an alarm process by mean of a screen display of the alarm contents (step 14) to thereby prohibit (lock) the operation and action.

On the other hand, in the case where the body EEP-ROM 411 is not installed in the magnetic bearing body 20 (step 12; N), the controlling section 400 identifies the model type of the magnetic bearing body 20 from the resistance value of the resistor 412 (step 15).

In the case where the model types of the magnetic bearing body 20 are identical with each other (step 13; Y), the controlling section 400 compares the model type of the magnetic bearing body 20 identified by the body EEP-ROM 411 or the model type identified in the step 15 with the model type of the magnetic bearing body 20 identified by the data stored in the device EEP-ROM 401 provided in the control device 40 to thereby judge whether or not both types are identical with each other (step 16). In the case where both are not identical with each other, the alarm process is performed in the same manner as in the step 14 (step 17) to thereby lock the operation and action.

In the case where the model types of the magnetic bearing body 20 identified by the body EEP-ROM 411, the resistor 412 and the device EEP-ROM 401, respectively, are identical with each other (step 16; Y), the controlling section 400 confirms whether or not the body EEP-ROM 411 and the device EEP-ROM 401 are normal. Namely, the controlling section 400 confirms whether or not unreasonable information is stored to thereby confirm whether or not the body EEP-ROM 411 and the device EEP-ROM 401 are normal (step 18, step 19 and step 20).

When both body EEP-ROM 411 and device EEP-ROM 401 are normal (step 18; Y, step 19; Y), the controlling section 400 confirms whether or not the contents of both EEP-ROM 411 and device EEP-ROM 401 are identical with each other (step 21).

When the contents of both EEP-ROMs 411 and 401 are identical with each other, the controlling section 400 performs tuning for controlling the magnetic bearing body 20 in accordance with the various characteristic values stored in the body EEP-ROM 411 (step 22) to complete the process. Thereafter, the magnetic bearing control for the magnetic bearing body in accordance with the various tuned characteristic values is performed by the controlling section 400.

On the other hand, in the case where the body EEP-ROM 411 is normal and the device EEP-ROM 401 is not normal (step 18; Y, step 19; N), the controlling section 400 performs the alarm process in the same manner as in the step 14 (step 23).

Then, after reset waiting for four seconds or longer (step 25), the controlling section 400 reads out the data of the body EEP-ROM 411 that is normal, and writes its content to the device EEP-ROM 401 to thereby renew the device EEP-ROM 401 with the normal content (step 26).

Thereafter, the controlling section 400 performs turning for controlling the magnetic bearing body in accordance with the content of the renewed device EEP-ROM 401 (step 22).

Also, in the case where both EEP-ROMs 411 and 401 are normal but both contents are not identical (step 21; N), since there is a possibility that the model type of the connected magnetic bearing body is changed, after reset waiting (step 25), the content of the device EEP-ROM 401 is renewed to the content of the body EEP-ROM 411 (step 26) to perform turning with the content of the renewed device EEP-ROM 401 (step 22).

In the case where the device EEP-ROM 401 is normal and the body EEP-ROM 411 is not normal (step 18; N, step 20; Y), the controlling section 400 performs the alarm process in the same manner as in the step 14 (step 27).

Then, after reset waiting for four seconds or longer (step 29), the controlling section 400 reads the data of the device EEP-ROM 401 and writes its content to the body EEP-ROM 411 to thereby renew the body EEP-ROM 411 with the normal content (step 30).

Thereafter, the controlling section 400 performs turning for controlling the magnetic bearing body in accordance with the content of the normal device EEP-ROM 401 (step 22).

In the case where both device EEP-ROM 401 and body EEP-ROM 411 are not normal (step 18; N, step 20; N), the controlling section 400 performs the alarm process in the same manner as in the step 14 (step 31).

After reset waiting for four seconds or longer (step 32), the controlling sections 400 reads the data such as various characteristic values corresponding to the model type of the magnetic bearing body 20 identified by the resistor 412 from the ROM table 402 and writes the content to the body EEP-ROM 411 and the device EEP-ROM 401 to thereby renew the data of both EEP-ROMs 401 and 411 (step 33).

The controlling section 400 performs turning for controlling the magnetic bearing body in accordance with the renewed content of the device EEP-ROM 401 (step 22).

As described above, in accordance with this embodiment, since the EEP-ROM 411 in which the model type or various characteristic values are recorded and the resistor 412 for confirmation of the model type are arranged in the magnetic bearing body (magnetic bearing device) 20, the device EEP-ROM 401 in which the model type or various characteristic values are recorded, is also arranged in the control device (magnetic bearing control device) 40, it is possible to confirm the model type of the magnetic bearing body 20 connected in the control device 40. Thus, it is possible to prevent the magnetic bearing body 20 from being driven by using different characteristic values.

Also, in the case where the magnetic bearing body 20 connected to the control device 40 is changed, if the body EEP-ROM 411 is normal, the stored content is stored in the device EEP-ROM 401 (step 21 to step 26). Thus, since it is possible to write the adjusted various characteristic values in advance to the device EEP-ROM 401 and use the values for controlling the magnetic bearing, any special technician does not have to adjust the machine. Accordingly, the user may change and adjust the model types.

Also, even if either body EEP-ROM 411 or device EEP-ROM 401 is not normal, it is possible to change the data to normal data by using the other normal data. Accordingly, even if the content of EEP-ROMs 411 and 401 is not normal due to some reason, it is possible to drive the magnetic bearing body 20 with suitable characteristic values in conformity with the model type.

Furthermore, even if both EEP-ROMs 411 and 401 are abnormal, the various characteristic values corresponding to the model type of the magnetic bearing body 20 identified by the resistor 412 are read out from the ROM table 402, it is possible to renew the data to correct data together with the model type data for both EEP-ROMs 411 and 401. It is unnecessary to ask the special technician or send the machine to the repair center.

Thus, the preferred embodiments of the invention have been described. However, the present invention is not limited to the specific embodiments but it is possible to make modifications and changes within the scope of the invention described in the appended claims.

For example, in the described embodiments, in the case where the model type of the magnetic bearing body 20 identified by the body EEP-ROM 411 and the model type identified by the resistor 412 are not identical with each other (step 13; N), and in the case where the model type of the magnetic bearing body 20 read out from the device EEP-ROM 401 and the model type identified by the body EEP-ROM 411 (step 13) or the model type identified by the resistor (step 15) are not identical with each other (step 16; N), the operation and action are prohibited (locked) after the alarm process (step 14, step 17). However, according to the invention, without prohibiting the operation and action, it is possible to move to the step 32 after the alarm process (step 14, step 17).

Also, in the case where the model type of the magnetic bearing body 20 identified by the body EEP-ROM 411 and the model type identified by the resistor 412 are different from each other, it is possible to make a judgment as to whether or not the model type identified by the resistor 412 is identical with the model type identified by the device EEP-ROM 401. In this case, if both are identical with each other, the operation goes to the step 29 after the alarm process and if not identical, the operation goes to step 33 after the alarm process.

According to the invention, it is possible to readily check the model type of the magnetic bearing body connected to the device.

Also, it is possible to automatically perform the confirmation and adjustment of the parameters for controlling the magnetic bearing body.

What is claimed is:

1. A magnetic bearing device comprising:
   means for magnetically levitating a rotary shaft without coming into contact therewith;
   model type identifying means for identifying a model type of the magnetic bearing device from among different model types;
   first memory means for storing characteristic values of the magnetic bearing device corresponding to the model type; and
   connecting means for connecting the model type identifying means and the first memory means to an external device during use of the magnetic bearing device to permit the external device to determine the model type of the magnetic bearing device from the model type identifying means, to compare the characteristic values stored in the first memory means with external data corresponding to the model type, and to replace the characteristic values stored in the first memory means with the external data when the comparison result indicates that the characteristic values are erroneous.

2. A magnet bearing device according to claim 1; wherein the model type identifying means comprises a resistor having a resistance value determined in accordance with the model type of the magnetic bearing device, and the memory means comprises rewritable memory means.

3. A magnetic bearing device according to claim 1; wherein the characteristic values include values used for compensating for errors between a mechanical center and an electrical center of the magnetic bearing device.

4. A magnetic bearing device according to claim 1; wherein the model type identifying means comprises a resistor having a resistance value set in accordance with the model type of the magnetic bearing device.

5. A magnetic bearing device according to claim 1; wherein the means for magnetically levitating a rotary shaft comprises axial and radial electromagnets spaced from the rotary shaft and controlled by the external device, and position sensors for detecting movement of the rotary shaft in axial and radial direction thereof and outputting a corresponding signal to the external device.

6. A magnetic bearing device according to claim 1; further comprising a first housing in which the model type identifying means, the first memory means, and the connecting means are disposed; wherein the connecting means must be connected to an external controller disposed in a second housing separate from the first housing to enable use of the magnetic bearing device.

7. A magnetic bearing device according to claim 1; wherein the external device comprises a controller separate from the magnetic bearing device and connected to the connecting means for accessing the model type identifying means and the first memory means and controlling the levitating means.

8. A magnetic bearing control device for controlling a magnetic bearing device which magnetically levitates a rotary shaft without coming in contact therewith, comprising:
   model type identifying means for identifying a model type of the magnetic bearing device from among different model types;
   first memory means for storing characteristic values of the magnetic bearing device corresponding to the model type;
   connecting means for accessing the model type identifying means and for the first memory means;
   second memory means which is rewritable for storing the model type of the magnetic bearing device and characteristic values of the magnetic bearing device;
   obtaining means for obtaining the model type from the model type identifying means through the connecting means and obtaining the characteristic values of the magnetic bearing device from the first memory means through the connecting means;
   renewal means for renewing contents of the second memory means with contents of the first memory means if the model type and the characteristic values obtained by the obtaining means differ from the model type and the characteristic values stored in the second memory means; and
   a controlling section for controlling the magnetic bearing device in accordance with the characteristic values stored in the second memory means.

9. A magnetic bearing control device according to claim 8; further comprising judgment means for judging whether or not contents of the first memory means and the second memory means are normal; wherein the renewal means renews the contents of the second memory means with the contents of the first memory means if it is judged by the judgment means that the contents of the first memory means and the second memory means are normal.

10. A magnetic bearing control device according to claim 8; wherein the characteristic values include values used for compensating for errors between a mechanical center and an electrical center of the magnetic bearing device.

11. A magnetic bearing control device according to claim 8; wherein the model type identifying means comprises a resistor having a resistance value set in accordance with the model type of the magnetic bearing device.

12. A magnetic bearing control device according to claim 11; wherein the resistor, the first memory means and the connecting means are provided in a bearing housing, and the second memory means, the obtaining means, the renewal means, and the controlling section are provided in a second housing separate from the first housing and connectable thereto through the connecting means.

13. A magnetic bearing control device for controlling a magnetic bearing device which magnetically levitates a rotary shaft without coming into contact therewith, comprising:

model type identifying means for identifying a model type of the magnetic bearing device from among different model types;

first memory means for storing characteristic values of the magnetic bearing device corresponding to the model type;

connecting means for accessing the model type identifying means and the first memory means;

second memory means which is rewritable for storing the model type of the magnetic bearing device and characteristic values of the magnetic bearing device;

obtaining means for obtaining the model type from the model type identifying means through the connecting means and obtaining the characteristic values of the magnetic bearing device from the first memory means through the connecting means;

judgment means for judging whether or not contents of the first memory means and the second memory means are normal;

renewal means for renewing contents of one of the first and second memory means with contents of the other memory means when the judgment means judges that contents of the one memory means are abnormal and the contents of the other memory means are normal; and a controlling section for controlling the magnetic bearing device in accordance with the characteristic values stored in the second memory means.

14. A magnetic bearing control device for controlling a magnetic bearing device which magnetically levitates a rotary shaft without coming into contact therewith, comprising:

model type identifying means for identifying a model type of the magnetic bearing device from among different model types;

first memory means for storing characteristic values of the magnetic bearing device corresponding to the model type;

connecting means for accessing the model type identifying means and the first memory means;

second memory means which is rewritable for storing the model type of the magnetic bearing device and characteristic values of the magnetic bearing device;

obtaining means for obtaining the model type from the model type identifying means through the connecting means and obtaining the characteristic values of the magnetic bearing device from the first memory means through the connecting means;

judgment means for judging whether or not contents of the first memory means and for the second memory means are abnormal;

third memory means for storing characteristic values of magnetic bearings of each of the different model types;

renewal means for reading the characteristic values corresponding to the model type from the third memory means and renewing the contents of the first and second memory means if the judgment means judges that contents of the first memory means and the second memory means are abnormal; and a controlling section for controlling the magnetic bearing device in accordance with the characteristic values stored in the second memory means.

15. A vacuum pump, comprising: a motor; a rotary body rotated by the motor and having a plurality of rotor blades along an axial direction thereof, each rotor blade extending in a radial direction of the rotary body and being rotated by the motor; a stator having a plurality of fixed blades confronting the rotor blades with a small gap between confronting blades; a casing for containing the motor, the rotary body, the rotor blades, the stator, and the fixed blades, and having a base portion; an inlet port for receiving a gas; an outlet port for discharging the gas; and a magnetic bearing device for magnetically levitating the rotary body, the magnetic bearing device comprising means for magnetically levitating the rotary body without coming into contact therewith, model type identifying means for identifying a model type of the magnetic bearing device from among different model types, first memory means for storing characteristic values of the magnetic bearing device corresponding to the model type, and connecting means for connecting the model type identifying means and the first memory means to an external device during use of the magnetic bearing device to permit the external device to determine the model type of the magnetic bearing device from the model type identifying means, to compare the characteristic values stored in the first memory means with external data corresponding to the model type, and to replace the characteristic values stored in the first memory means with the external data when the comparison result indicates that the characteristic values are erroneous.

16. A vacuum pump, comprising: a motor; a rotary body rotated by the motor and having a plurality of rotor blades along an axial direction thereof, each rotor blade extending in a radial direction of the rotary body and being rotated by the motor; a stator having a plurality of fixed blades confronting the rotor blades with a small gap between confronting blades; a casing for containing the motor, the rotary body, the rotor blades, the stator, and the fixed blades, and having a base portion; an inlet port for receiving a gas; an outlet port for discharging the gas; and a magnetic bearing control device for magnetically levitating the rotary body, the magnetic bearing device comprising model type identifying means for identifying a model type of the magnetic bearing device from among different model types, first memory means for storing characteristic values of the magnetic bearing device corresponding to the model type, connecting means for accessing the model type identifying means and the first memory means, second memory means which is rewritable for storing the model type of the magnetic bearing device and characteristic values of the magnetic bearing device, obtaining means for obtaining the model type from the model type identifying means through the connecting means and obtaining the characteristic values of the magnetic bearing device from the first memory means through the connecting means, renewal means for renewing contents of the second memory means with contents of the first memory means if the model type and the characteristic values obtained by the obtaining means differ from the model type and the characteristic values stored in the second memory means, and a controlling section for controlling the magnetic bearing device in accordance with the characteristic values stored in the second memory means.

17. A magnetic bearing device comprising: electromagnets for magnetically levitating a rotary shaft without coming into contact therewith; a model type identifying device from which a model type of the magnetic bearing device can be determined from among different model types; a first memory for storing characteristic data of the magnetic bearing device; and a connector for enabling a connection to be made to an external controller during use of the magnetic bearing device to permit the external controller to control the electromagnets, to determine the model type of the magnetic bearing device, and to compare the characteristic data with external data to determine if the characteristic data or the external data is erroneous.

18. A magnetic bearing device according to claim 17; wherein the external controller is separate from the magnetic bearing device and is connected to the connector for accessing the model type identifying device and the first memory, and controlling the electromagnets.

19. A magnetic bearing device according to claim 18; further comprising position sensors for detecting movement of the rotary shaft in axial and radial directions thereof and outputting corresponding signals.

20. A magnetic bearing device according to claim 19; wherein the external controller controls the electromagnets in accordance with the characteristic data and the output signals of the position sensors.

21. A magnetic bearing device according to claim 20; wherein the external controller has a rewritable memory for storing the model type of the magnetic bearing device and characteristic data of the magnetic bearing device.

22. A magnetic bearing device according to claim 21; wherein the external controller further comprises obtaining means for obtaining the model type from the model type identifying device through the connector and obtaining the characteristic data from the first memory through the connector, and renewal means for renewing contents of the rewritable memory with contents of the first memory if the model type and the characteristic data obtained by the obtaining means differ from the model type and the characteristic data stored in the rewritable memory.

23. A magnetic bearing device according to claim 22; wherein the renewal means renews contents of the first memory with contents of the rewritable memory if the model type and the characteristic data obtained by the obtaining means are erroneous.

24. A magnetic bearing device according to claim 17; wherein the characteristic data includes data used for compensating for errors between a mechanical center and an electrical center of the magnetic bearing device.

25. A magnetic bearing device according to claim 17; wherein the model type identifying device comprises a resistor having a resistance value set in accordance with the model type of the magnetic bearing device.

* * * * *